(12) United States Patent
Chuong et al.

(10) Patent No.: US 9,541,006 B2
(45) Date of Patent: Jan. 10, 2017

(54) INTER-MODULE FLOW DISCOURAGER

(71) Applicant: United Technologies Corporation, Hartford, CT (US)

(72) Inventors: Conway Chuong, Manchester, CT (US); Matthew Budnick, Tolland, CT (US)

(73) Assignee: United Technologies Corporation, Farmington, CT (US)

( * ) Notice: Subject to any disclaimer, the term of this patent is extended or adjusted under 35 U.S.C. 154(b) by 1244 days.

(21) Appl. No.: 13/730,889

(22) Filed: Dec. 29, 2012

(65) Prior Publication Data

US 2014/0255168 A1   Sep. 11, 2014

(51) Int. Cl.
| F02C 7/28 | (2006.01) |
| F01D 11/00 | (2006.01) |
| F01D 25/28 | (2006.01) |
| F01D 25/30 | (2006.01) |

(52) U.S. Cl.
CPC ............... *F02C 7/28* (2013.01); *F01D 11/005* (2013.01); *F01D 25/28* (2013.01); *F01D 25/30* (2013.01)

(58) Field of Classification Search
CPC ........... F02C 7/28; F01D 11/005; F01D 25/28; F01D 25/30; F01D 25/243; F01D 25/265
USPC .................................. 415/213.1, 214.1, 220
See application file for complete search history.

(56) References Cited

U.S. PATENT DOCUMENTS

| 2,124,108 A | 7/1938 | Grece |
| 3,576,328 A | 4/1971 | Vose |
| 3,970,319 A | 7/1976 | Carroll et al. |
| 4,088,422 A | 5/1978 | Martin |
| 4,114,248 A | 9/1978 | Smith et al. |
| 4,330,234 A * | 5/1982 | Colley .................... F01D 11/22 415/127 |
| 4,478,551 A | 10/1984 | Honeycutt, Jr. et al. |
| 4,645,217 A | 2/1987 | Honeycutt, Jr. et al. |
| 4,678,113 A | 7/1987 | Bridges et al. |
| 4,738,453 A | 4/1988 | Ide |
| 4,756,536 A | 7/1988 | Belcher |
| 4,920,742 A | 5/1990 | Nash et al. |
| 4,987,736 A | 1/1991 | Ciokajlo et al. |
| 4,993,918 A | 2/1991 | Myers et al. |
| 5,031,922 A | 7/1991 | Heydrich |
| 5,042,823 A | 8/1991 | Mackay et al. |

(Continued)

FOREIGN PATENT DOCUMENTS

| EP | 1445537 A2 | 8/2004 |
| FR | 2875851 A1 | 3/2006 |
| JP | 2004316542 A | 11/2004 |

OTHER PUBLICATIONS

International Searching Authority, PCT Notification of Transmittal of the International Search Report and the Written Opinion, Apr. 15, 2014, 15 pages.

(Continued)

*Primary Examiner* — Eric Keasel
*Assistant Examiner* — Danielle M Christensen
(74) *Attorney, Agent, or Firm* — Kinney & Lange, P.A.

(57) ABSTRACT

An assembly for a gas turbine engine includes a first module, a second module, and a flow discourager. The second module is connected to the first module along a joint. The flow discourager is connected to the first module and extends to be received in a notch in the second module. The flow discourager acts to direct an ingestion gas flow away from the joint between the first module and the second module.

18 Claims, 5 Drawing Sheets

(56) References Cited

U.S. PATENT DOCUMENTS

| | | | |
|---|---|---|---|
| 5,071,138 A | 12/1991 | Mackay et al. | |
| 5,100,158 A | 3/1992 | Gardner | |
| 5,108,116 A | 4/1992 | Johnson et al. | |
| 5,169,159 A | 12/1992 | Pope et al. | |
| 5,174,584 A | 12/1992 | Lahrman | |
| 5,188,507 A | 2/1993 | Sweeney | |
| 5,211,541 A | 5/1993 | Fledderjohn et al. | |
| 5,224,822 A | 7/1993 | Lenahan et al. | |
| 5,236,302 A | 8/1993 | Weisgerber et al. | |
| 5,246,295 A | 9/1993 | Ide | |
| 5,273,397 A | 12/1993 | Czachor et al. | |
| 5,338,154 A | 8/1994 | Meade et al. | |
| 5,370,402 A | 12/1994 | Gardner et al. | |
| 5,385,409 A | 1/1995 | Ide | |
| 5,401,036 A | 3/1995 | Basu | |
| 5,474,305 A | 12/1995 | Flower | |
| 5,558,341 A | 9/1996 | McNickle et al. | |
| 5,632,493 A | 5/1997 | Gardner | |
| 5,755,445 A | 5/1998 | Arora | |
| 5,911,400 A | 6/1999 | Niethammer et al. | |
| 5,961,279 A | 10/1999 | Ingistov | |
| 6,196,550 B1 | 3/2001 | Arora et al. | |
| 6,343,912 B1 | 2/2002 | Manteiga et al. | |
| 6,364,316 B1 | 4/2002 | Arora | |
| 6,439,841 B1 | 8/2002 | Bosel | |
| 6,601,853 B2 | 8/2003 | Inoue | |
| 6,612,809 B2 | 9/2003 | Czachor et al. | |
| 6,619,030 B1 | 9/2003 | Seda et al. | |
| 6,637,751 B2 | 10/2003 | Aksit et al. | |
| 6,638,013 B2 | 10/2003 | Nguyen et al. | |
| 6,652,229 B2 | 11/2003 | Lu | |
| 6,736,401 B2 | 5/2004 | Chung et al. | |
| 6,805,356 B2 | 10/2004 | Inoue | |
| 6,811,154 B2 | 11/2004 | Proctor et al. | |
| 6,935,631 B2 | 8/2005 | Inoue | |
| 6,983,608 B2 | 1/2006 | Allen, Jr. et al. | |
| 7,094,026 B2 | 8/2006 | Coign et al. | |
| 7,238,008 B2 | 7/2007 | Bobo et al. | |
| 7,367,567 B2 | 5/2008 | Farah et al. | |
| 7,371,044 B2 | 5/2008 | Nereim | |
| 7,527,469 B2 | 5/2009 | Zborovsky et al. | |
| 7,631,879 B2 | 12/2009 | Diantonio | |
| 7,735,833 B2 | 6/2010 | Braun et al. | |
| 7,798,768 B2 | 9/2010 | Strain et al. | |
| 8,069,648 B2 | 12/2011 | Snyder et al. | |
| 8,083,465 B2 | 12/2011 | Herbst et al. | |
| 8,152,451 B2 | 4/2012 | Manteiga et al. | |
| 8,221,071 B2 | 7/2012 | Wojno et al. | |
| 8,245,518 B2 | 8/2012 | Durocher et al. | |
| 2003/0025274 A1 | 2/2003 | Allan et al. | |
| 2003/0042682 A1 | 3/2003 | Inoue | |
| 2003/0062684 A1 | 4/2003 | Inoue | |
| 2003/0062685 A1 | 4/2003 | Inoue | |
| 2003/0161727 A1 | 8/2003 | MacLean et al. | |
| 2004/0139746 A1* | 7/2004 | Soechting | F01D 9/023 60/752 |
| 2005/0046113 A1 | 3/2005 | Inoue | |
| 2006/0123797 A1* | 6/2006 | Zborovsky | F01D 9/041 60/800 |
| 2007/0297899 A1 | 12/2007 | Burdgick | |
| 2008/0053107 A1* | 3/2008 | Weaver | F01D 9/023 60/800 |
| 2010/0132371 A1 | 6/2010 | Durocher et al. | |
| 2010/0132374 A1 | 6/2010 | Manteiga et al. | |
| 2010/0132377 A1 | 6/2010 | Durocher et al. | |
| 2010/0307165 A1 | 12/2010 | Wong et al. | |
| 2011/0000223 A1 | 1/2011 | Russberg | |
| 2011/0079019 A1 | 4/2011 | Durocher et al. | |
| 2011/0214433 A1 | 9/2011 | Feindel et al. | |
| 2011/0262277 A1 | 10/2011 | Sjoqvist et al. | |
| 2012/0111023 A1 | 5/2012 | Sjoqvist et al. | |

OTHER PUBLICATIONS

Extended European Search Report for EP Application 138686332, dated Apr. 8, 2016, 8 pages.

* cited by examiner

INTER-MODULE FLOW DISCOURAGER

BACKGROUND

The invention relates to gas turbine engines, and more particularly to a flow discourager disposed between engine modules.

Gas turbine engines operate according to a continuous-flow, Brayton cycle. A compressor section pressurizes an ambient air stream, fuel is added and the mixture is burned in a central combustor section. The combustion products expand through a turbine section where bladed rotors convert thermal energy from the combustion products into mechanical energy for rotating one or more centrally mounted shafts. The shafts, in turn, drive the forward compressor section, thus continuing the cycle. Gas turbine engines are compact and powerful power plants, making them suitable for powering aircraft, heavy equipment, ships and electrical power generators. In power generating applications, the combustion products can also drive a separate power turbine attached to an electrical generator.

For ease of assembly, gas turbine engines are typically designed in sections typically called modules. Each section is comprised of various components. The modules are then assembled together at the engine level. W-seals, feather seals, and/or dog-bone seals are typically used between modules to seal the modules against ingestion gas flow from a main gas flow path of the gas turbine engine. However, these seals utilize a firm contacting interface that imparts a relatively large load on the modules to accomplish the sealing. Additionally, the seals can become damaged, for example, during engine level assembly when the modules are joined together.

SUMMARY

An assembly for a gas turbine engine includes a first module, a second module, and a flow discourager. The second module is connected to the first module along a joint. The flow discourager is connected to the first module and extends to be received in a notch in the second module. The flow discourager acts to direct an ingestion gas flow away from the joint between the first module and the second module.

An assembly for a gas turbine engine includes a first outer radial casing section, a second outer radial casing section, and a flow discourager. The second casing section is connected to the first casing section. The flow discourager is mounted to the first casing section and extends to interface with the second casing section along a gap having both a generally axial portion and a generally radial portion with respect to a centerline axis of the gas turbine engine.

A turbine section for a gas turbine engine includes a first module, a second module, and a flow discourager. The first module has an first outer radial casing section and a fairing and the second module has a second outer radial casing section that is connected to the first casing section. The flow discourager is disposed radially outward from both the fairing and a main gas flow path of the gas turbine engine and extends between the first casing section and the second casing section. An inner radial surface of the second casing section has a radial distance from a centerline axis of that gas turbine engine that differs from a radial distance of an inner radial surface of the flow discourager in order to reduce an ingestion gas flow into an area between the first casing section and the second casing section.

DETAILED DESCRIPTION

A flow discourager is mounted to a first module and extends across a joint between the first module and a second module. The flow discourager is received in a notch in the second module such that the flow discourager and the second module interface along a gap. The flow discourager acts to redirect an ingestion gas flow away from the joint between the modules. Because the flow discourager is spaced from the second module by the gap, operational wear and potential for installation damage to the flow discourager is reduced or eliminated. Additionally, the flow discourager can be more easily manufactured at reduced cost when compared to conventional seals. Subsequently, the flow discourager can replace more costly or complicated seals at the inter-modular interface.

Figure 1:
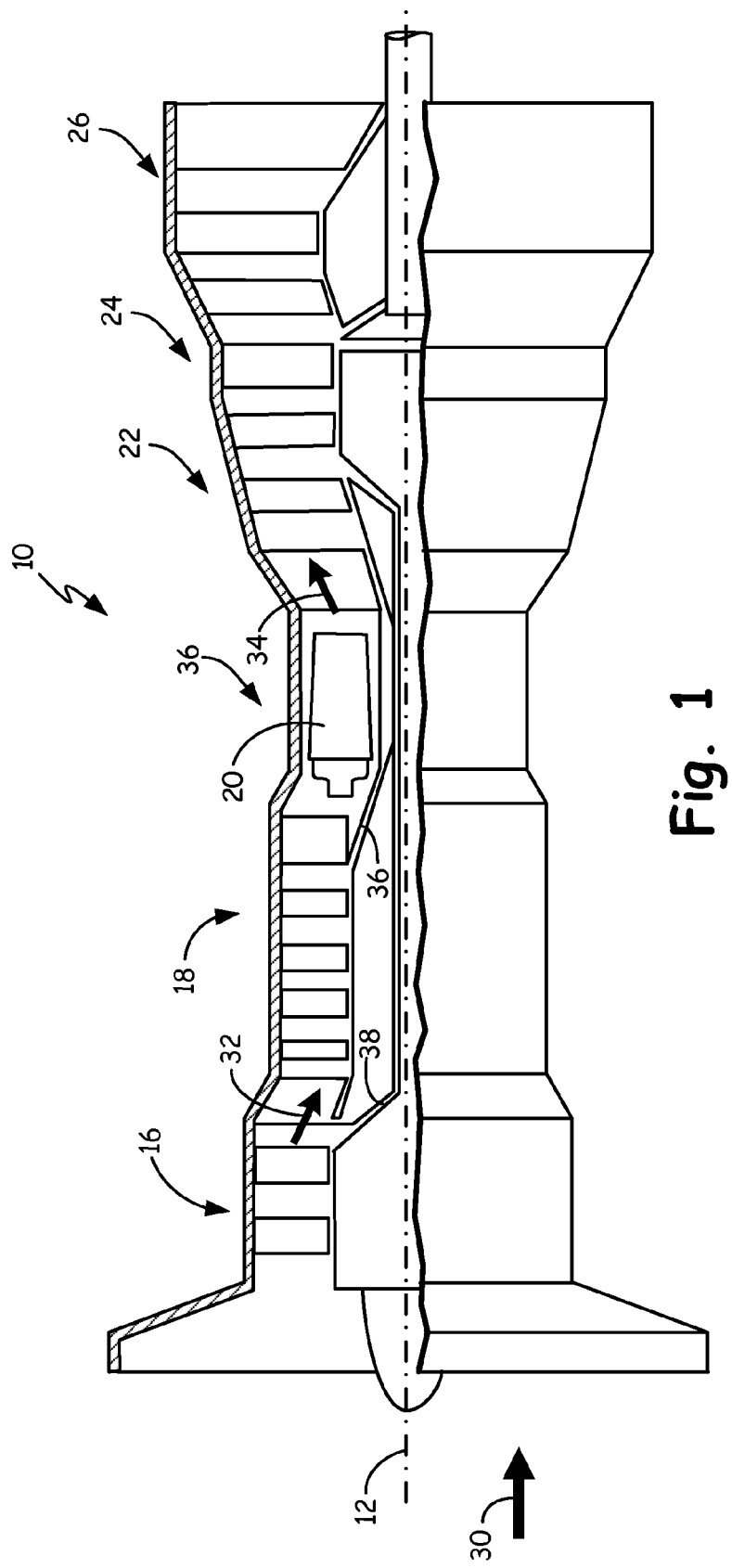
FIG. 1 is a partial cross-sectional view of an exemplary gas turbine engine.

An exemplary industrial gas turbine engine 10 is circumferentially disposed about a central, longitudinal axis or axial engine centerline axis 12 as illustrated in FIG. 1. The engine 10 includes in series order from front to rear, low and high pressure compressor sections 16 and 18, a central combustor section 20 and high and low pressure turbine sections 22 and 24. In some examples, a free turbine section 26 is disposed aft of the low pressure turbine 24. Although illustrated with reference to an industrial gas turbine engine, this application also extends to aero engines with a fan or gear driven fan, and engines with more or fewer sections than illustrated.

As is well known in the art of gas turbines, incoming ambient air 30 becomes pressurized air 32 in the compressors 16 and 18. Fuel mixes with the pressurized air 32 in the combustor section 20, where it is burned to produce combustion gases 34 that expand as they flow through turbine sections 22, 24 and power turbine 26. Turbine sections 22 and 24 drive high and low pressure rotor shafts 36 and 38 respectively, which rotate in response to the combustion products and thus the attached compressor sections 18, 16. Free turbine section 26 may, for example, drive an electrical generator, pump, or gearbox (not shown).

It is understood that FIG. 1 provides a basic understanding and overview of the various sections and the basic operation of an industrial gas turbine engine. It will become apparent to those skilled in the art that the present application is applicable to all types of gas turbine engines, including those with aerospace applications.

Figure 2:
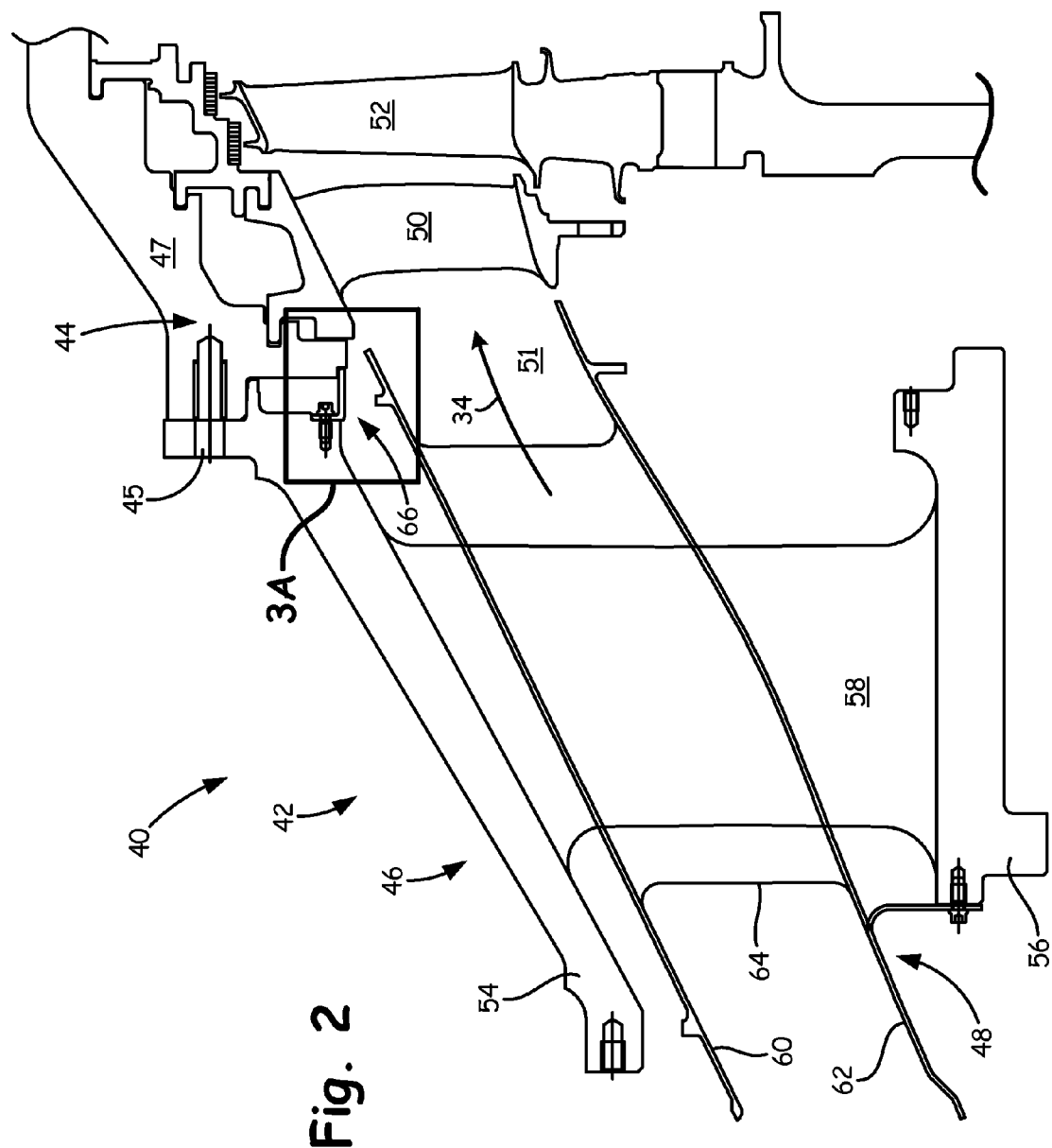
FIG. 2 is a cross-section of an assembly including a first module, a flow discourager, and a second module arranged together.

FIG. 2 shows an assembly 40 of a first module 42 and a second module 44 interconnected by fasteners 45. First module 42 includes a frame 46 and a fairing 48. Second module 44 includes a stator vane 50 and a rotor blade 52. Frame 46 includes an outer radial casing 54, an inner radial platform 56, and struts 58. Fairing 48 includes an outer radial platform 60, and inner radial platform 62, and strut liners 64. Flow discourager 66 is disposed between first module 42 and second module 44.

First module 42 comprises a portion of gas turbine engine 10 (FIG. 1), and therefore, can form portions of compressor sections 16 and 18 or turbine sections 22 and 24. First module 42 includes various components including outer radial casing 54 and other components of frame 46 and fairing 48. Second module 44 is connected to first module 42 via fasteners 45 such that modules 42 and 44 abut along casings 54 and 47. In addition to outer radial casing 47, second module 44 additionally houses components such as stator vane 50 and rotor blade 52 therein. Vane 50 and blade 52 are disposed downstream of frame 46 and fairing 48 with respect to the direction of flow of combustion gases 34 along main engine gas flow path 51.

Similar to first module 42, second module 44 includes various components including outer radial casing 47, stator vane 50, and a rotor blade 52. As previously discussed, gas turbine engines typically are divided into modules for ease of assembly and design. Modules such as first module 42 and second module 44 are then assembled together at the engine level to create the various engine portions illustrated for gas turbine engine 10 of FIG. 1.

In the embodiment shown, first module 42 includes frame 46 which extends axially along and generally radially through main engine gas flow path 51. Outer radial casing 54 is connected to inner radial platform 56 by struts 58 (only one is shown in FIG. 2). Fairing 48 is affixed to frame 46 and is adapted to be disposed within frame 46 radially inward of outer radial casing 54 and radially outward of inner radial platform 56. Strut liners 64 are adapted to be disposed around struts 58.

Outer radial platform 60 of fairing 48 has a generally conical shape. Similarly, inner radial platform 62 has a generally conical shape. Inner radial platform 62 is spaced from outer radial platform 60 by strut liners 64. Outer radial platform 60, inner radial platform 62, and strut liners 64, form a portion of main engine gas flow path 51 of gas turbine engine 10 when assembled. Gases such as combustion gases 34 pass through main engine gas flow path 51 during operation.

As illustrated in FIG. 2, flow discourager 66 is disposed between outer radial casing 54 of first module 42 and outer radial casing 47 of second module 44. Flow discourager 66 is located at a radial distance away from outer radial platform 60 of fairing 48 as well as main engine gas flow path 51. As will be discussed subsequently, flow discourager 66 is received in a notch in outer radial casing 47 of second module 44 and does not contact second module 44 but is separated therefrom by a gap. As a result of this arrangement, operational wear and potential for installation damage to flow discourager 66 is reduced or eliminated.

Figure 3A:
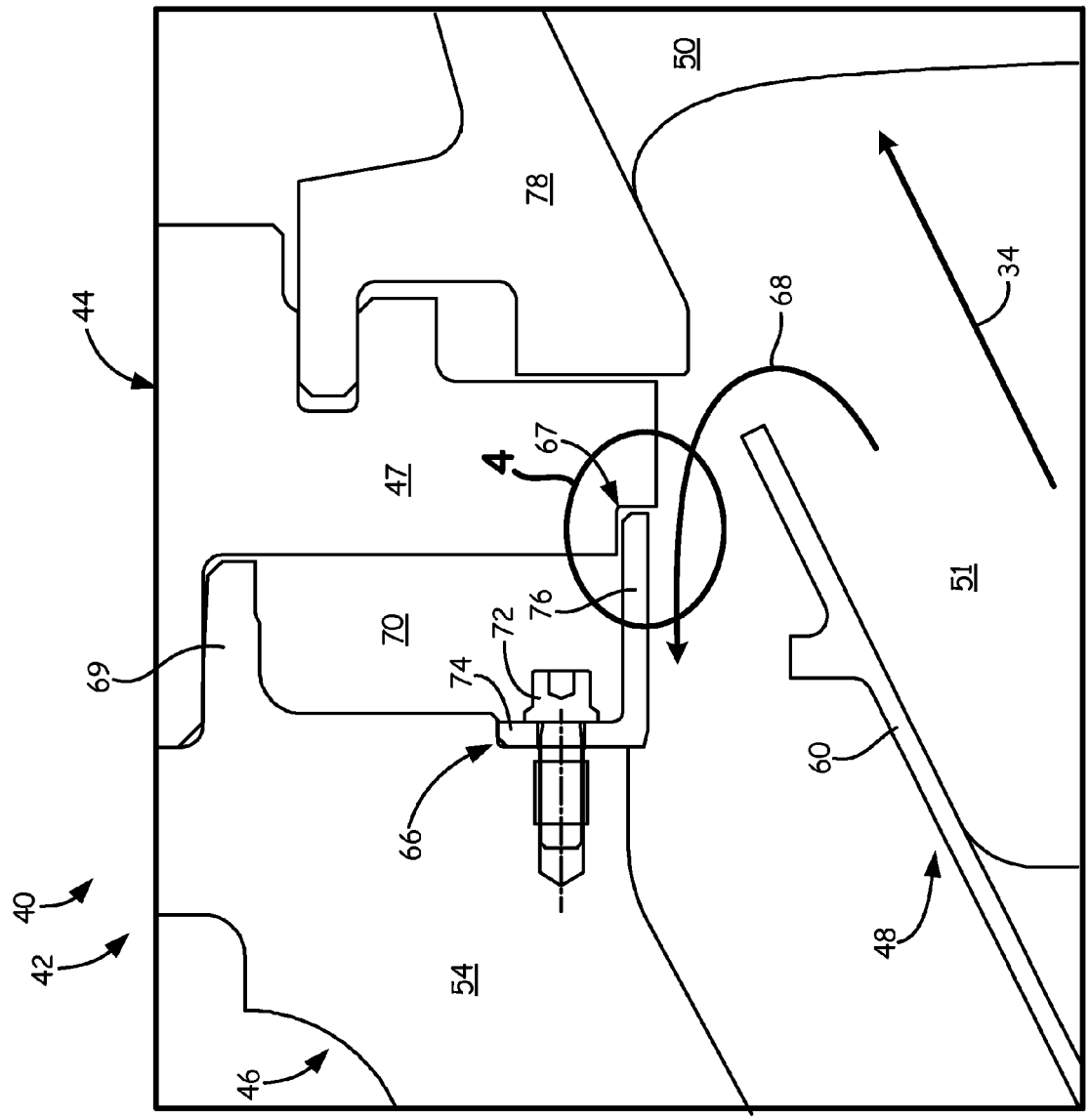
FIG. 3A is an enlarged cross-section of the assembly of FIG. 2 including the first module, flow discourager, and second module arranged together.
Figure 3B:
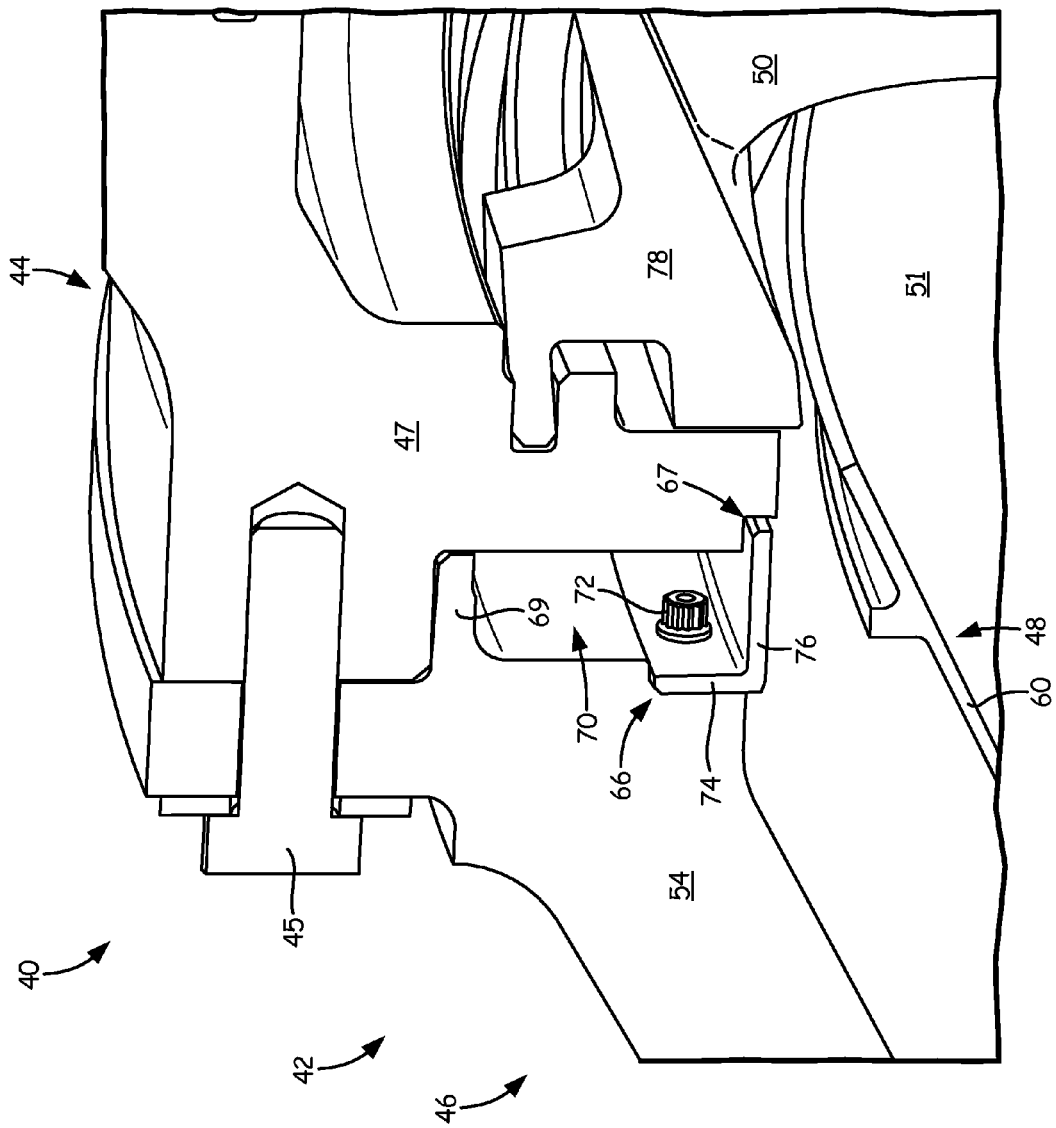
FIG. 3B is a perspective view showing the first module, flow discourager, and second module.

FIGS. 3A and 3B show a cross-section of assembly 40 with flow discourager 66 mounted to outer radial casing 54 of first module 42 and extending aft to be received in a notch 67 in outer radial casing 47 of second module 44. In addition to frame 46, fairing 48, vane 50, assembly 40 includes a snap 69, a cavity 70, fasteners 72, and a vane platform 78. Flow discourager 66 includes a flange 74 and an arm 76.

As shown in FIGS. 3A and 3B, outer radial casing 54 can include snap 69 that snaps into an interference fit with a mating portion of outer radial casing 47 along the joint between first module 42 and second module 44. As described previously, flow discourager 66 is mounted between first module 42 and second module 44 radially inward of snap 69 and discourages (redirects) ingestion airflow 68 away from the joint between first module 42 and second module 44.

Cavity 70 is disposed radially outward of flow discourager 66 and is formed along the joint between first module 42 and second module 44. Flow discourager 66 separates cavity 70 from outer radial platform 60 of fairing 48. Fasteners 72 are disposed within cavity 70 and mount flow discourager 66 to first module 42. As shown in FIG. 3B, flow discourager 66 can comprise a full ring with a circumference similar to those of casings 54 and 47. In other embodiments, flow discourager 66 may have a plurality of segments and/or be mounted to second module rather than first module.

Flow discourager 66 is fixed along flange 74 but arm 76 is free to cantilever outward to interface with second module 44 in notch 67. As will be discussed subsequently, the arrangement of flow discourager 66 in notch 67 creates a gap between flow discourager 66 and second module 44. Thus, flow discourager 66 does not contact second module 44. In other embodiments, flow discourager can act as a sealing flange and make contact with one or more surfaces of second module 44. In other embodiments, flow discourager can be mounted to second module 44 and extend to interface with first module 42.

In operation, an ingestion gas flow 68 may pass from main engine gas flow path 51 aft of outer radial platform 60 and enter the space between fairing 48 and outer radial casing 54. Flow discourager 66 acts to direct ingestion gas flow 68 away from cavity 70 and away from the joint between first module 42 and second module 44. Although flow discourager 66 is disposed radially outward of main engine gas flow path 51 and fairing 48 in FIGS. 2-3B, in other embodiments, flow discourager 66 can be disposed radially inward of main engine gas flow path 51.

Figure 4:
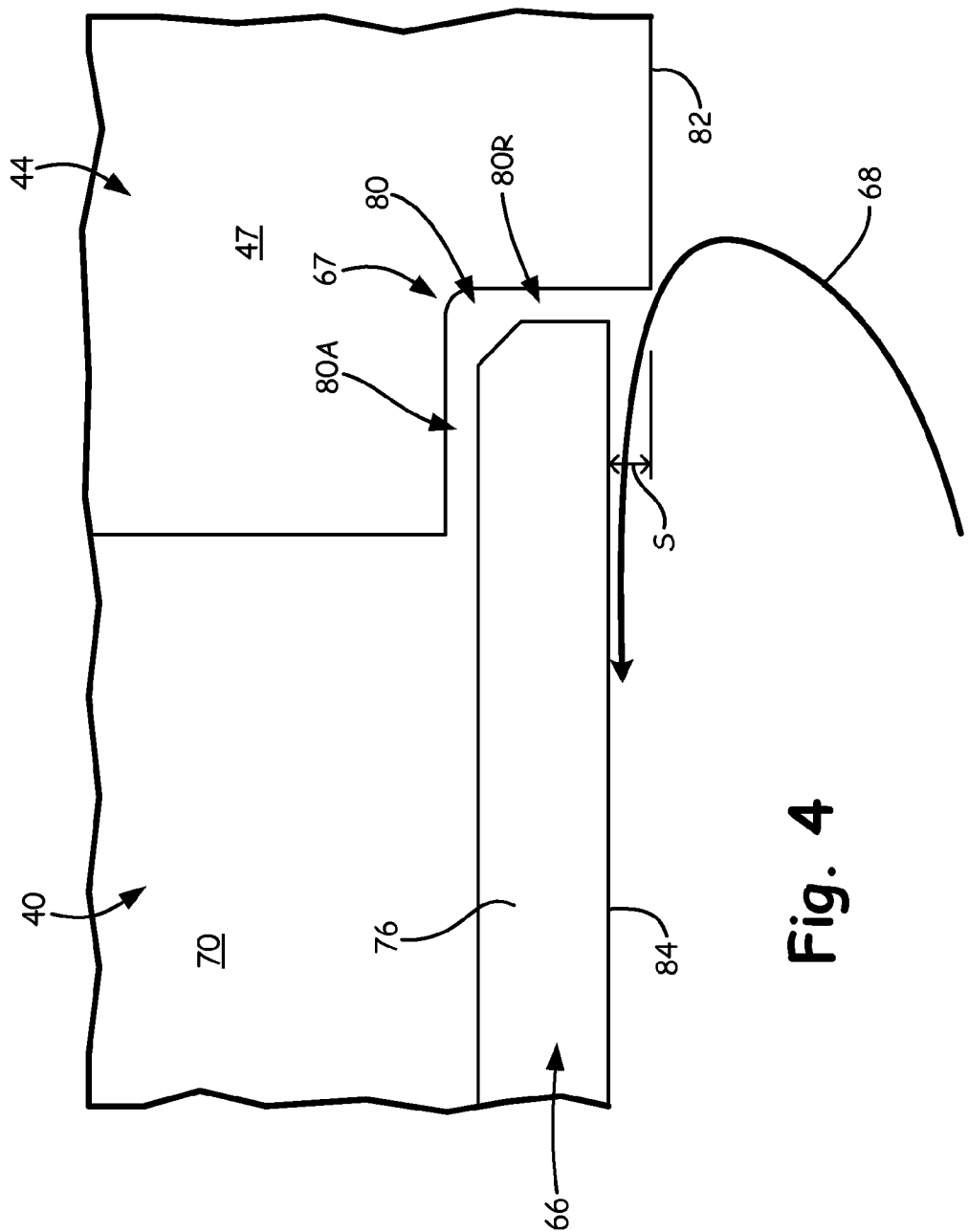
FIG. 4 is an enlarged cross-section of the first module, flow discourager, and second module specifically showing the configuration of the flow discourager and second module that creates a gap therebetween.

FIG. 4 shows flow discourager 66 extending into notch 67 in outer radial casing 47 of second module 44. In addition to arm 76, ingestion gas flow 68, and cavity 70, assembly 40 includes a gap 80 with an axial portion 80A and a radial portion 80R, an inner radial surface 82, and an inner radial surface 84.

Arm 76 of flow discourager 66 interfaces with second module 44 along gap 80. As shown in FIG. 4, gap 80 forms a tortuous path for an ingestion gas flow 68 seeking to pass between flow discourager 66 into cavity 70. In particular, gap 80 changes directions and has generally radial portion 80R as well as generally axial portion 80A with respect to centerline axis 12 (FIG. 1) of gas turbine engine 10. Thus, ingestion gas flow 68 must change flow directions in order to pass along gap 80 (i.e. ingestion gas flow 68 must travel generally radially as well as axially) to reach cavity 70.

Inner radial surface 82 of outer radial casing 47 is offset or staggered from inner radial surface 84 of arm 76. Thus, inner radial surface 82 of second module 44 has a radial distance with respect to centerline axis 12 that differs from a radial distance of inner radial surface 82 of flow discourager 66. This arrangement creates a step S between flow discourager 66 and second module 44 which discourages ingestion gas flow 68 from entering gap 80. In other embodiments, a chamfer can be used on flow discourager 66 on inner radial surface 84, at the gap 80R, in order to create a similar step S and discourage ingestion gas flow 68.

A flow discourager is mounted to a first module and extends across a joint between the first module and a second module. The flow discourager is received in a notch in the second module such that the flow discourager and the second module interface along a gap. The flow discourager acts to redirect an ingestion gas flow away from the joint between the modules. Because the flow discourager is spaced from the second module by the gap, operational wear and potential for installation damage to the flow discourager is reduced or eliminated. Additionally, the flow discourager can be more easily manufactured at reduced cost when compared to conventional seals. Subsequently, the flow discourager can replace more costly or complicated seals at the inter-modular interface.

Discussion of Possible Embodiments

The following are non-exclusive descriptions of possible embodiments of the present invention.

An assembly for a gas turbine engine includes a first module, a second module, and a flow discourager. The second module is connected to the first module along a joint. The flow discourager is connected to the first module and extends to be received in a notch in the second module. The flow discourager acts to direct an ingestion gas flow away from the joint between the first module and the second module.

The assembly of the preceding paragraph can optionally include, additionally and/or alternatively, any one or more of the following features, configurations and/or additional components:

the flow discourager and second module interface along a gap, and wherein the gap has portions that extend both generally axially and generally radially with respect to a centerline axis of the gas turbine engine;

the flow discourager causes an ingestion gas flow to change a flow direction in order to pass along the gap;

an inner radial surface of the second module has a radial distance from a centerline axis of the gas turbine engine that differs from a radial distance of an inner radial surface of the flow discourager;

the flow discourager comprises a ring with a flange and an arm extending from the flange;

the arm extends generally axially with respect to a centerline axis of the gas turbine engine;

the first module comprises an outer radial casing section and the second module comprises an outer radial casing section;

the first module comprises a turbine frame;

the flow discourager directs the ingestion flow into a space between the turbine frame and a fairing;

an upstream end of the second module is connect to a downstream end of the first module; and the flow discourager contacts the second module at one or more surfaces.

An assembly for a gas turbine engine includes a first outer radial casing section, a second outer radial casing section, and a flow discourager. The second casing section is connected to the first casing section. The flow discourager is mounted to the first casing section and extends to interface with the second casing section along a gap having both a generally axial portion and a generally radial portion with respect to a centerline axis of the gas turbine engine.

The assembly of the preceding paragraph can optionally include, additionally and/or alternatively, any one or more of the following features, configurations and/or additional components:

the flow discourager causes an ingestion gas flow to change a flow direction in order to pass along the gap;

an inner radial surface of the second casing section has a radial distance that differs from an inner radial surface of the flow discourager;

the flow discourager comprises a ring with a flange and an arm extending from the flange; and the arm extends into an notch of the second outer radial casing.

A turbine section for a gas turbine engine includes a first module, a second module, and a flow discourager. The first module has an first outer radial casing section and a fairing and the second module has a second outer radial casing section that is connected to the first casing section. The flow discourager is disposed radially outward from both the fairing and a main gas flow path of the gas turbine engine and extends between the first casing section and the second casing section. An inner radial surface of the second casing section has a radial distance from a centerline axis of that gas turbine engine that differs from a radial distance of an inner radial surface of the flow discourager in order to reduce an ingestion gas flow into an area between the first casing section and the second casing section.

The turbine section of the preceding paragraph can optionally include, additionally and/or alternatively, any one or more of the following features, configurations and/or additional components:

the flow discourager is connected to the first casing and extends to interface with the second casing along a gap having both a generally axial section and generally radial section with respect to a centerline axis of the gas turbine engine;

an upstream end of the second module is connect to a downstream end of the first module; and the flow discourager causes the ingestion gas flow to change a flow direction into a space between the first casing and the fairing.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. An assembly for a gas turbine engine, comprising:
   a first module comprising a turbine frame;
   a second module connected to the first module along a joint, wherein the second module has a notch adjacent to the joint, and wherein the notch is formed by a first wall extending generally radially from an innermost radial surface of the second module and a second wall extending generally axially from an axially-facing wall of the second module; and
   a flow discourager affixed to the first module and extending to be received in the notch in the second module, wherein the flow discourager directs an ingestion gas flow away from the joint between the first module and the second module and into a space between the turbine frame and an outer radial platform of a fairing disposed radially inward from the turbine frame and adapted to surround a strut extending through the fairing.

2. The assembly of claim 1, wherein the flow discourager is axially spaced from the first wall of the notch and radially spaced from the second wall of the notch to form a gap having portions that extend both generally axially and generally radially with respect to a centerline axis of the gas turbine engine.

3. The assembly of claim 2, wherein the flow discourager causes the ingestion gas flow to change a flow direction in order to pass along the gap.

4. The assembly of claim 1, wherein the innermost radial surface of the second module has a radial distance from a centerline axis of the gas turbine engine that is less than a radial distance from the centerline axis of an innermost radial surface of the flow discourager such that the innermost radial surface of the second module, the first wall of the notch, and the innermost radial surface of the flow discourager form a step.

5. The assembly of claim 1, wherein the flow discourager comprises a ring with a flange and an arm extending from the flange, and wherein the arm extends generally axially with respect to a centerline axis of the gas turbine engine.

6. The assembly of claim 1, wherein the first module comprises a first outer radial casing section and the second module comprises a second outer radial casing section.

7. The assembly of claim 1, wherein an upstream end of the second module is connected to a downstream end of the first module.

8. The assembly of claim 1, wherein the flow discourager contacts the second module at one or more surfaces.

9. The assembly of claim 1, wherein affixing the flow discourager to the first module substantially restrains relative displacement between the flow discourager and the first module in an axial direction, a radial direction, and a circumferential direction.

10. An assembly for a gas turbine engine, comprising:
a first outer radial casing section;
a first inner radial casing section;
a strut extending from the first inner radial casing section to the first outer radial casing section; and
a fairing surrounding the strut to define a main gas flow path;
a second outer radial casing section connected to the first outer radial casing section; and
a flow discourager mounted to the first outer radial casing section and extending to form a contactless interface with the second outer radial casing section, wherein a distal end of the flow discourager is spaced from the second outer radial casing section to form a gap therebetween, the gap having both a generally axial portion and a generally radial portion with respect to a centerline axis of the gas turbine engine, and wherein the flow discourager is configured to direct an ingestion gas flow into a space between the first outer radial casing section and an outer radial platform of the fairing.

11. The assembly of claim 10, wherein the flow discourager causes an ingestion gas flow to change a flow direction in order to pass along the gap.

12. The assembly of claim 10, wherein an innermost radial surface of the second outer radial casing section has a radial distance that differs from an innermost radial surface of the flow discourager.

13. The assembly of claim 10, wherein the flow discourager comprises a ring with a flange and an arm extending from the flange.

14. The assembly of claim 13, wherein the arm extends into a notch formed by first and second walls of the second outer radial casing, wherein the first wall extends generally radially from an innermost radial surface of the second outer radial casing, and wherein the second wall extends generally axially from an axially-facing wall of the second outer radial casing.

15. A turbine section for a gas turbine engine, comprising:
a first module comprising:
a first outer radial casing section;
a first inner radial casing section;
a strut extending from the first inner radial casing section to the first outer radial casing section; and
a fairing surrounding the strut to define a main gas flow path;
a second module having a second outer radial casing section connected to the first outer radial casing section;
a flow discourager that is disposed radially outward from both the fairing and the main gas flow path of the gas turbine engine and extends from the first outer radial casing section towards the second outer radial casing section to form a contactless interface therewith, wherein an innermost radial surface of the second outer radial casing section has a radial distance from a centerline axis of that gas turbine engine that differs from a radial distance of an innermost radial surface of the flow discourager in order to reduce an ingestion gas flow into an area between the first outer radial casing section and the second outer radial casing section.

16. The turbine section of claim 15, wherein the flow discourager is connected to the first outer radial casing and is spaced from the second outer radial casing to form a gap therebetween, the gap having both a generally axial section and a generally radial section with respect to a centerline axis of the gas turbine engine.

17. The turbine section of claim 15, wherein an upstream end of the second module is connected to a downstream end of the first module.

18. The turbine section of claim 15, wherein the flow discourager causes the ingestion gas flow to change a flow direction into a space between the first outer radial casing and the fairing.

\* \* \* \* \*